E. B. FENBY.
COLLAR, CUFF, AND LIKE FOLDING MACHINE.
APPLICATION FILED APR. 30, 1912.

1,099,593.

Patented June 9, 1914.
8 SHEETS—SHEET 1.

E. B. FENBY.
COLLAR, CUFF, AND LIKE FOLDING MACHINE.
APPLICATION FILED APR. 30, 1912.

1,099,593.

Patented June 9, 1914.

Fig. 8.

UNITED STATES PATENT OFFICE.

EDGAR BEVERLEY FENBY, OF COVENTRY, ENGLAND.

COLLAR, CUFF, AND LIKE FOLDING MACHINE.

1,099,593.  Specification of Letters Patent.  Patented June 9, 1914.

Application filed April 30, 1912. Serial No. 694,243.

*To all whom it may concern:*

Be it known that I, EDGAR BEVERLEY FENBY, a subject of the King of Great Britain, residing at Coventry, in the county of Warwick, England, have invented certain new and useful Improvements in Collar, Cuff, and like Folding Machines, of which the following is a specification.

This invention relates to a machine for folding or turning over the hems or margins of collars, cuffs and like articles, and has for its object to produce a new machine adapted to greatly increase the rate at which work of this kind can be performed and to improve the nature of the work turned out.

Briefly stated, the functions of a machine according to the invention are to press a collar blank into a matrix by means of a thin die so that the blank is cupped, to cause the sides and ends of the matrix (hereinafter termed folders) to relatively contract or move inwardly so as to fold the upstanding edges or hem of the cupped blank over the thin die, to cause the die to contract so that it recedes from the fold or hem and is ready to pass up between the contracted folders, to raise the die, to press the folded hem against the undersides of the folders by a heated bed so as to confine the fold and when the bed is lowered to retract the folders so as to free the blank, which is then finished so far as the folding of the hem is concerned.

In order to perform the above functions a machine according to the present invention comprises a collapsible die, a matrix consisting of a set of folders, and a heated bed, and means for operating said elements in proper sequence to perform the functions above stated, and for convenience, and to render the description of the complete machine easier to follow, reference will be first made to the diagrammatic drawings Figures 1 to 4 of the accompanying sheets of drawings wherein:—

Fig. 1, shows in cross section the dies on the point of descending to cup a collar blank, the parts being shown in section to correspond with Fig. 8, to be hereinafter referred to; Fig. 2, shows the dies after descent, the collar blank being cupped, Fig. 3, shows the folders advanced and the edges of the collar blank folded over the dies, while Fig. 4, shows the dies collapsed and on the point of ascending prior to the pressing of the fold by the rising presser bed.

Referring to these figures, the collar blank *a*, (see Fig. 1) shown by a cross section taken transverse to its length, rests in checks *b*, provided in the side folders *c*; end folders to be described hereinafter are also provided so that the side and end folders together frame a space the size and shape of the collar after its edges have been folded over. Adapted to pass through this space with a suitable small clearance, and corresponding in shape, are a set of dies, of which the side dies *d*, are shown attached to legs *e*, while end dies are carried by the side dies in a manner to be described. The heated presser bed 47, which is resiliently mounted, is situated immediately below the folders *c*.

Figures 1, 2, 3, 4, 9:
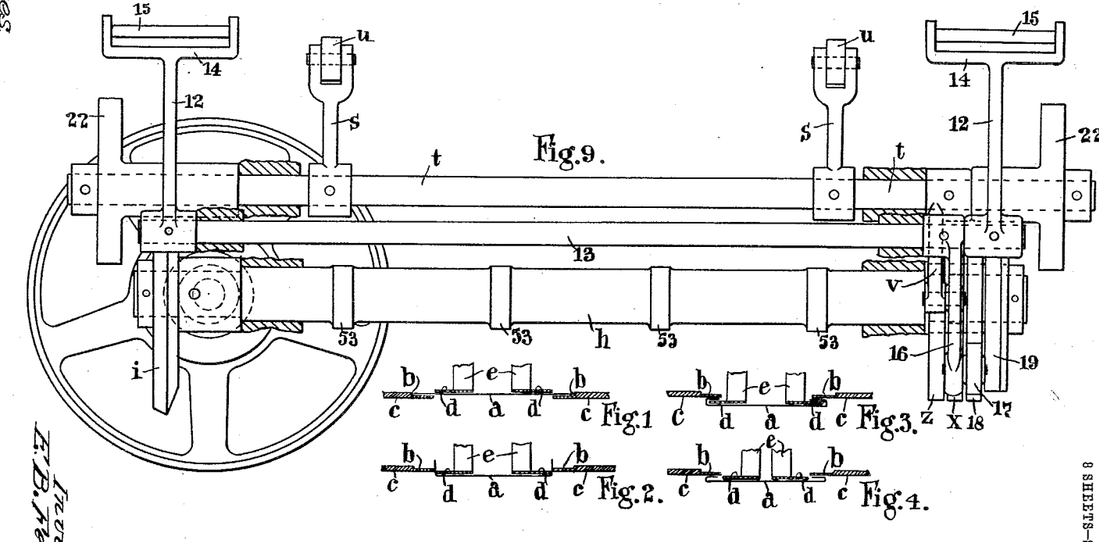

With the different parts in the position shown in Fig. 1, the dies *d*, descend passing through the space framed by the folders until they reach a position just below the level of the folders, this motion as indicated in Fig. 2, causing the collar blank to be cupped around its entire margin. The side folders, *c*, and also the end folders then advance inward folding the upturned edge of the collar blank over the dies into the position shown in Fig. 3. The actual folding required has now been effected but before the collar blank can be removed both the side dies *d*, and the end dies must be withdrawn inwardly into a position clear of the folds as shown in Fig. 4, so that they may be removed for the insertion of a new blank. Finally the heated presser bed 47, is forced upward and confines the fold by pressing it against the folders. The above operations are carried into effect by a machine embodying the improvements referred to above, one specific form of which by way of example is shown in the accompanying drawings, of which—

Fig. 9, is a front view of the driving shaft, cam shafts and similar operating mechanisms shown separately for clearness. Fig. 14, shows a detail plan view of one of the end folder carriers removed from the machine for clearness. Fig. 15, showing in plan the sliding piece adapted to carry the folder proper and Fig. 16 showing a corresponding front view with the cover in place. Fig. 18, is a side view of a buttonhole extension die, while finally

Figure 8:
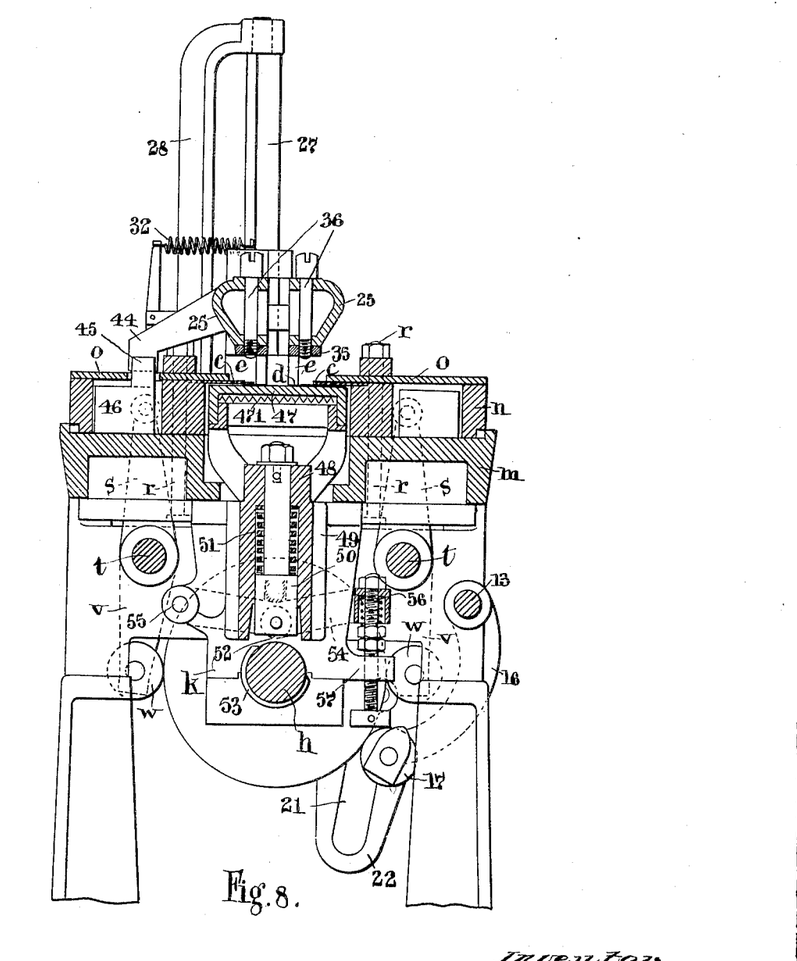
Fig. 8, is a section through the line 8—8 of Fig. 5, looking toward the right, but with the dies in their lowered position.
Figure 10:
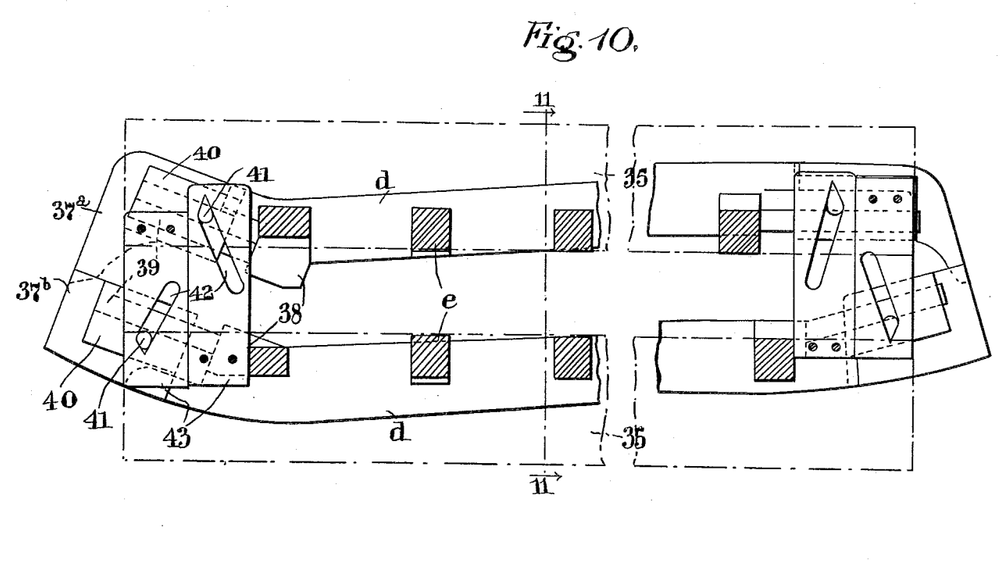
Fig. 10 shows a plan view of the collapsing dies.

In carrying the invention into effect according to one construction, the machine is provided with a main operating cam shaft $h$, extending from one end of the machine to the other, by means of each revolution of which the series of operations of cupping, folding and pressing are effected. This cam shaft has mounted on it at one end a bevel wheel $i$, through which it is driven. The cam shaft $h$, is mounted in the main frame $k$, forming the principal stationary part of the machine which is provided with an upper part or bed $m$, on which the folder carriers $n$, slide backward and forward. These carriers, as seen in Fig. 8, carry the side folders $c$, clamped to them by means of the plates $o$, and bolts $r$. The side folder carriers $n$, are moved to and fro by levers $s$, mounted on shafts $t$, (see also Fig. 9) which are rotatably mounted in appropriate parts of the main framing of the machine. The levers $s$, two of which are provided for each folder carrier, are forked at their upper ends and each carry a pivoted block $u$, which fits into a corresponding recess in the appropriate folder carrier, (see Fig. 5). The shafts $t$, also have mounted upon them levers, $v$, each carrying a roller $w$, which co-acts with a corresponding cam mounted on the main cam shaft $h$. Thus, the front folder carrier lever is operated by the cam $x$, while the back folder carrier lever is operated by the cam $z$.

Figure 5:
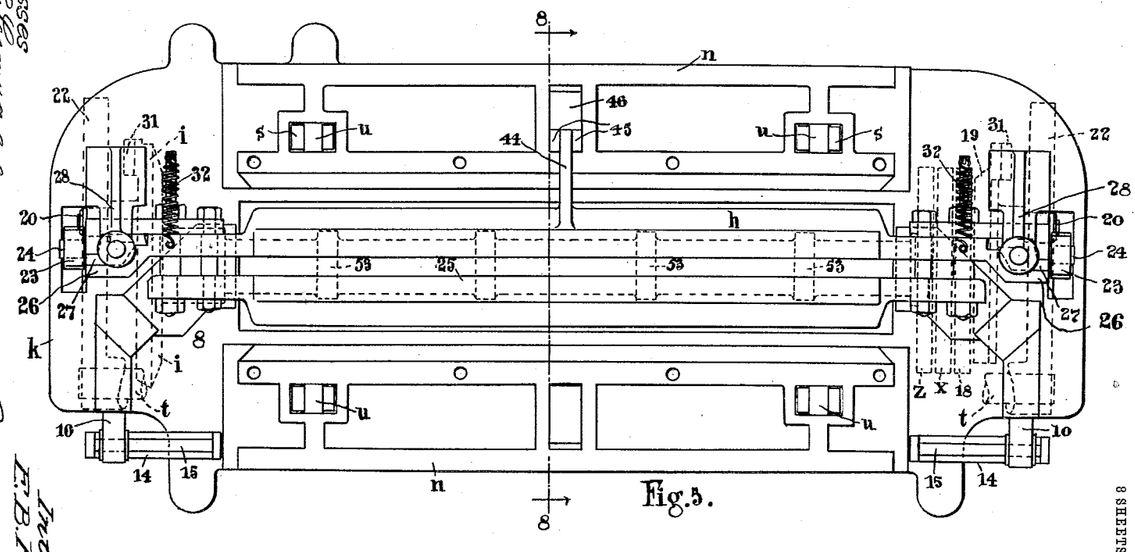
Fig. 5, shows a plan view of the machine as a whole.
Figure 6:
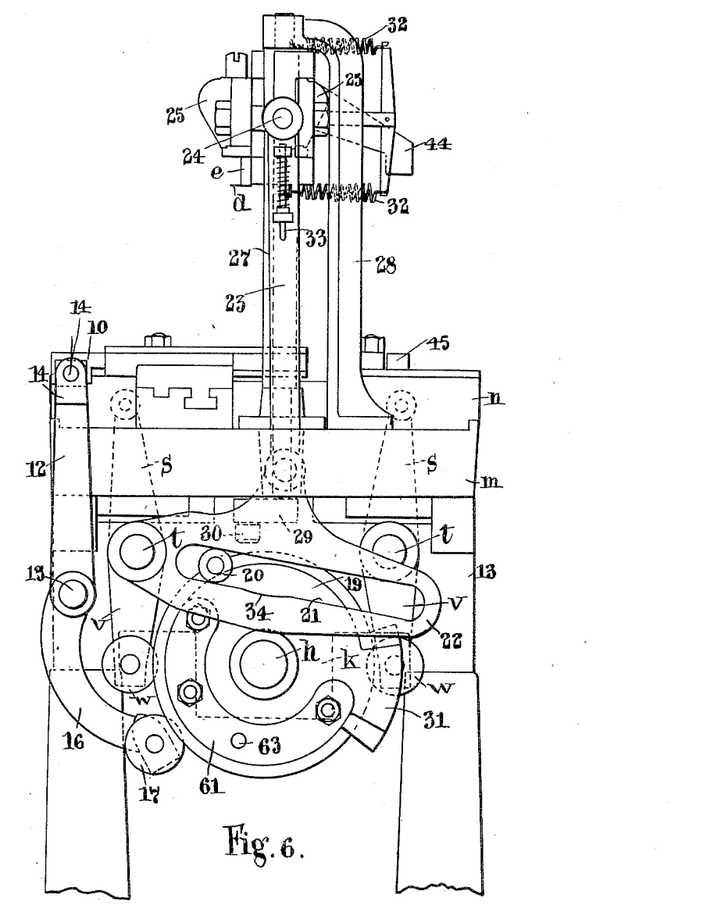
Fig. 6, is a view looking on the right hand end of Fig. 5, the dies being shown in their raised position.
Figure 7:
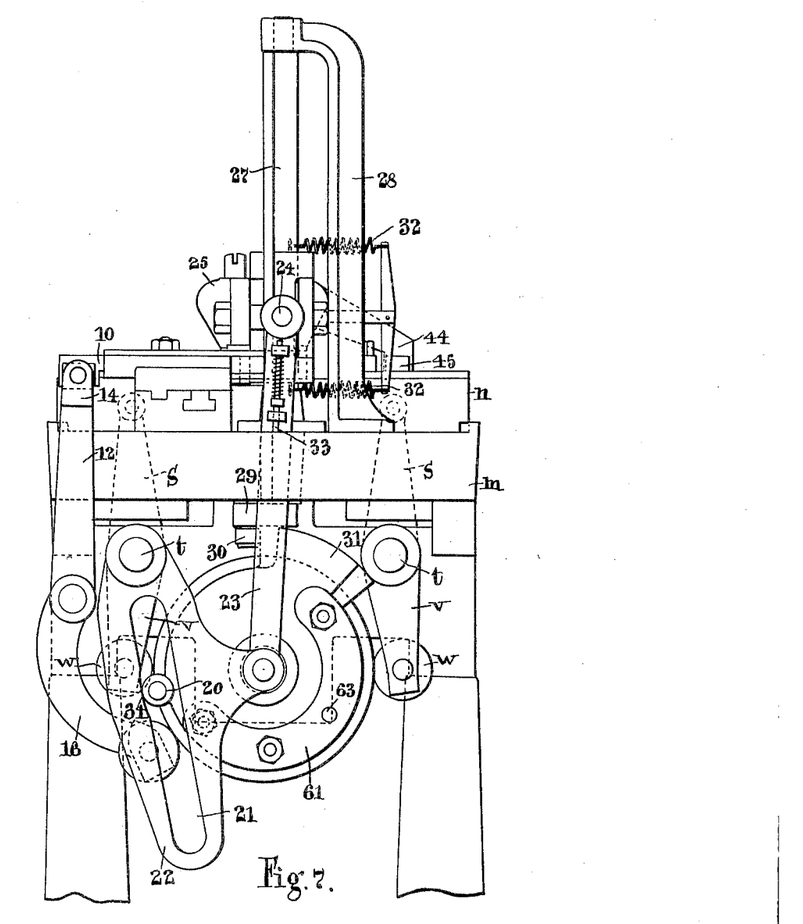
Fig. 7, is a similar end view but with the dies in their lowered position.
Figures 14, 15, 16, 18:
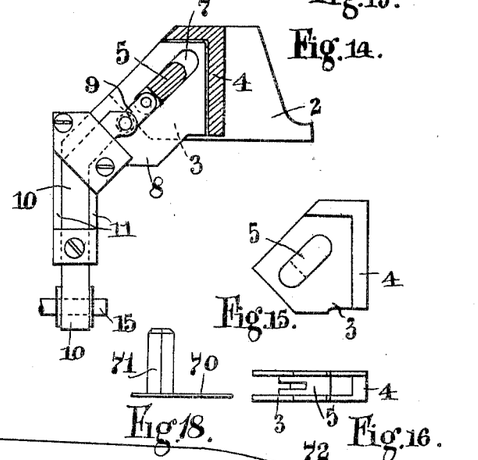

The end folders proper 2, are carried on a sliding box-shaped piece consisting of a base 3, provided with a rim 4, and a feather 5. The feather 5, engages with a slot 7, in a fixed guide, 8, which is inclined at an angle, as shown in Figs. 5 and 14. The box-shaped folder carrier is connected by a link 9, to a sliding piece 10, carried in guides 11, as shown, reciprocation of the sliding piece 10, causing the end folders to advance and retire as required. Each of the sliding pieces 10, one for each end of the machine, is operated by a lever 12, mounted on a shaft 13, running the length of the machine, each lever, 12, having an extended forked head 14, provided with a pin 15, coöperating with the end of the corresponding sliding piece 10. The shaft 13, has also mounted on it a lever 16, carrying at its end a roller 17, which coöperates with a third cam, 18, mounted on the main cam shaft $h$.

Figure 13:
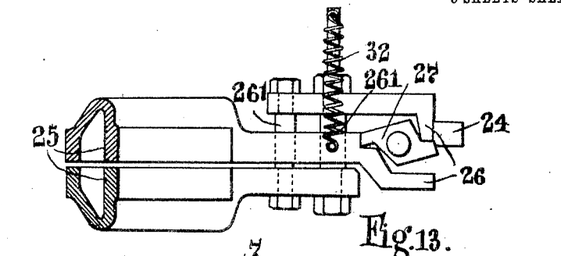
Fig. 13, shows a plan view on a smaller scale of one end of the die-head in the collapsed position.

In order to raise and lower the die-head the bevel wheel $i$, at one end of the cam shaft, and the motion plate 19, at the other end, are each provided with a projecting pin 20, which engages with a slot 21, in a swinging link 22, mounted one at each end on the cam shaft $t$, operating the front folder carriers. Each of the links 22, has pivoted to it a rod 23, which passes upward and at its upper end connects to a pin, 24, on the die head. The die-head is the principal member carrying the die, and extends along the machine from one end to the other. It comprises two stiff bars, 25, the ends of which cross, as shown in Fig. 13, so as to form a pair of caliper jaws 26 at each end of the die-head. One jaw 26, of each pair is formed integrally with its bar 25, while the other, in order to conveniently effect the crossing, is connected to its bar by bolts 26¹ which pass freely through the end of the other bar. Each of the pairs of jaws 26, clamps between them a vertical bar 27 pivoted at its upper end in the bracket 28, and at its lower end in the frame of the machine. These bars 27 are of the cross section shown clearly in Fig. 5 and Fig. 13, and each is provided at its lower end with a crank 29 and a crank pin 30, the latter being operated at the proper time by face cams 31, mounted respectively on the motion plate 19, and the bevel wheel $i$. The bars 27, on rotating about their axes thus act to draw the bars 25 together and so collapse the dies, the dies and bars being subsequently returned to their operative positions by stiff springs indicated at 32. By this means I insure that the bars and therefore the die plates will be held rigid when in the expanded condition so that the whole die is maintained true to shape during the folding operation. Then again the die plates are also equally surely contracted to clear the folding as the springs 32 are still further compressed during the contracting of the dies and this compression is effected by the positive action of the rotatable bars or guides 27.

The rods 23, each carry a spring-pressed pin 33, which abuts against a suitable part of the frame of the machine when the dies are in their lower position, and so takes the weight of the die head, rods 23, and links 22, and causes the pins 20, to be held in proper relationship to the slots 21. Each of these slots 21, has a portion 34, struck from the center of the cam shaft $h$, so that a pause may be given in the motion during the time the folders are acting and the die parts are being collapsed. By relieving the bed of the weight of the parts referred to above the dies do not press unduly on the blank and crinkling of the blank is avoided. In this lowest position of the die plates and head they are freely suspended which has the effect of insuring true and delicate operation in spite of the heavy weight of these parts.

The side dies $d$, are carried from the die carrier by legs $e$, depending from the plates 35, which are fastened to the bars 25, by the screw pins 36. The end dies $37^a$ and $37^b$, are withdrawn by means of the following mechanism when the carrier bars, 25, are brought together: Referring to one end only, each plate 35, carries a block 38, provided with a guide shown as a pin 39. On each of these pins slide respectively other blocks 40, carrying the end dies $37^a$ and $37^b$. Each of the blocks 40, carries an upwardly projecting pin 41, engaging with an inclined slot 42, formed in a bridge piece or transverse member 43. The one bridging member 43, is attached to one of the bars 35, while the other member, 43 is attached to the opposite bar. Consequently when the bars 25, are brought together by the mechanism provided for the purpose, the blocks 40, and with them the end dies are withdrawn by sliding along the pins 39. The die-head of the machine is preferably provided with a finger alining piece, 44, near its center adapted to engage between the upstanding ears 45, of a block 46, fitting in a recess in the back folder carrier $n$. This device which is very desirable as the parts are liable to be effected by changes in temperature, causes the die to be accurately alined with the folders.

Along the center of the machine is provided the presser bed 47, heated in any usual manner known in the art, for instance by an electric resistance 471. The bed 47, has a projection 48, supported in suitable vertical slides 49. In this projection 48, slides a member 50, controlled by a strong spring 51, the member 50, carrying at its lower end rollers 52, adapted to be operated by the cams 53, on the main shaft $h$. The weight of the presser bed is normally taken by an arm 54, pivoted at one end on the pin 55, and provided at the other end with an adjustable spring controlled pin 56, threaded into a lug 57, on the frame of the machine. The arm 54, is supported on a spring, the tension of which may be adjusted by turning the threaded pin 56, in the lug 59.

The general operation of the machine described is as follows:—Assuming a collar blank in place as shown in Fig. 1, the die-blank head operated by way of the pins 20, slotted links 22, and connecting rods, 23, descends and cups the blank. The side folders $c$, mounted on their carriers $n$, and the end folders 2, on their box-shaped carriers, then advance in the order determined by the setting of the cams $x$, $z$, and 18, the side folders being operated from the cams $x$, and $z$, by way of the levers, $v$, $s$, and shaft $t$, and the end folders being operated from the cam, 18, by way of the lever, 12, and 16, on shaft 13. The edge of the collar blank has now been folded over the dies as shown in Fig. 3. By continued rotation of the main shaft, $h$, the cams 31, situated on the bevel wheel, $i$, and the motion plate 19, engage respectively with the pins 30, thereby rotating the vertical bars 27, on which the die head slides and by separation of the caliper jaws 26, causing the main bars 25, of the die-head to approach and so collapse the dies. During the advance of the folders and collapse of the dies, the die-head has remained stationary owing to the pins 20, on the bevel wheel $i$, and motion plate 19, engaging with the parts 34, of the slots 21, struck from the center of the shaft $h$, after the pins 20, have passed these parts 34, the links 22, and rods 23 are again operated thereby raising the die-head, while the cams 53, on the shaft $h$, raise the heated presser bed and so press the folded edge of the collar blank against the folders, thereby confining the fold. Finally, the folders are withdrawn, the folded collar blank substituted by a new blank and the above cycle of operations repeated.

The levers 16, and $v$, are held in operative engagement with their respective cams by suitable springs which can be applied either to the levers direct or to the shafts 13, and $t$, on which they are mounted. These springs are not shown in the drawings as they are mechanical expedients which are obvious to those skilled in the art, and their inclusion would tend to detract from the clearness of the drawings.

For some shapes of collar, and for collar tops, it is only necessary to have one stem and sliding block at each end of the die, and my invention is equally adapted to the construction of dies for this work.

Figures 11, 12, 17:
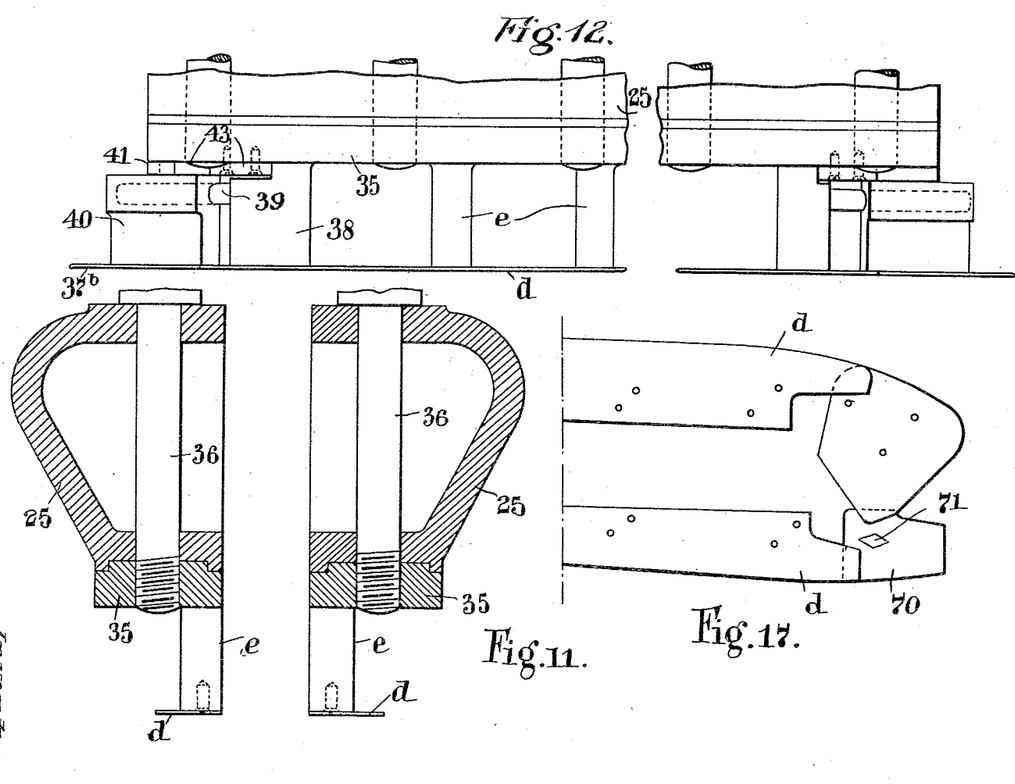
Fig. 11, a corresponding section on the line 11—11 of Fig. 10.
Fig. 12, a front view of one end.
Fig. 17, is a plan of a modified form of die.
Figure 19:
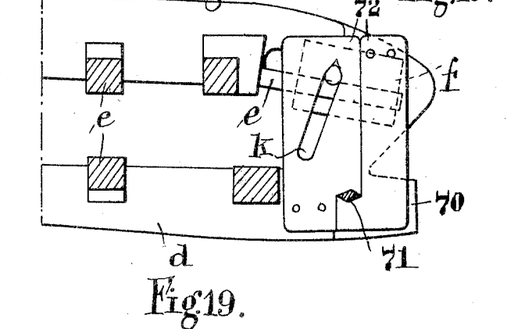
Fig. 19, is a plan of the parts operating the modified die.

A further feature of my invention is directed to the utilization of the dies in connection with extended buttonhole collars, which it has not hitherto been possible to fold by the aid of machinery. According to this part of my invention, (see Figs. 17, to 19,) to form the extension I use a loose piece of thin brass or like non-rusting metal 70, having an upwardly projecting suitably shaped stem 71, adapted to be resiliently held on or be clamped between the plates 72, of the die when expanded, so that when the die as a whole is raised after collapsing the loose piece 70, is left behind and removed by hand, being re-inserted in position, in the die in its top position.

It will be evident that many other variations can be made in details without departing from the spirit of the invention.

I claim:—

1. In a machine for folding collar and like blanks, two parallel die head parts movable toward and away from one another, spring means drawing said die head parts toward one another, a movable member interposed between and separating said die head parts in their proper positions against the action of said springs, side die plates fixed to said die head parts and movable therewith and means for moving said movable separating member against the action of said springs and cause said die head parts to approach, substantially as described.

2. In a machine for folding collar and like blanks, two parallel die head parts movable toward and away from one another, spring means drawing said die head parts toward one another, a movable member interposed between and separating said die head parts in their proper positions against the action of said springs, side die plates fixed to said die head parts and movable therewith, means for moving said separating member to stretch said springs and cause said die head parts to approach one another, and end die plates mounted at the end of said side die plates, and operated therewith, through the common spring means and movable member.

3. In a machine for folding collar and like blanks, parallel die head parts, end parts, movable members interposed between said end parts, springs pulling said end parts together and against said movable members, means for moving said movable members to cause said die head parts to approach, and die plates carried by said die head parts, said die plates being located between said movable members.

4. In a machine for folding collar and like blanks, die head parts movable toward and away from one another, die plates carried thereby, side extension jaws on said die head parts located clear of the die plates, bolts passing through said extension jaws, one of said bolts being fixed to one of the said jaws and slidable in the other, spring means drawing said jaws together and a movable member located between said jaws and clear of the die plates to cause said jaws and die head parts to move toward and away from one another.

5. In a machine for folding the hems of collar blanks, comprising a two-part die-head having side dies and end dies, means for causing the parts of the die-head to approach one another, consisting of crossed over caliper ends on said parts and a rotary bar between said caliper ends, and springs for moving the parts of the die-head away from one another, substantially as and for the purpose hereinbefore set forth.

6. In a machine for folding the hems of collar blanks, comprising a two-part die-head having side dies and end dies, springs for yieldingly holding the parts of the die-head apart, cross over caliper ends on the parts of the die-head, rotary bars between said ends, means for reciprocating the die-head on said bars, and means for rotating said bars to cause the parts of the die-head to approach one another against the action of said springs, substantially as and for the purpose hereinbefore set forth.

7. In a machine for folding the hems of collar blanks, a collapsible die having side dies and end dies, guide bars for said die, means for reciprocating the die on said guide bars, means for rotating the guide bars, and means operable by the guide bars for contracting said collapsible die, substantially as and for the purpose hereinbefore set forth.

8. In a machine for folding the hems of collar blanks, a collapsible die having side dies and end dies, guide bars for said die, means for rotating said guide bars, means operable by said guide bars for contracting the collapsible die, and means for raising and lowering the die on said guide bars comprising pivoted slotted links, crank pins on rotary disks for oscillating said links, and connecting rods for connecting said links with the collapsible die, substantially as and for the purpose hereinbefore set forth.

9. In a machine for folding the edges of collar and like blanks, a collapsible die comprising a two part die head, side die plates and end die plates carried by said die head, a matrix comprising side folders and end folders, means for moving said die head into a position with its die plates in said matrix, a fixed frame supporting said die head and moving means, means operable to move said die parts relatively when said parts are in the matrix and a resiliently mounted pin movable with said die head and located to rest on said frame during said relative movement of the die parts to relieve the weight of the said die head and parts from the base of the matrix.

10. In a folding machine, separate and relatively movable die head parts, guides carried by said die head parts, blocks slidable on said guides transversely to the relative movement of said die head parts, slotted bridging members engaging with the blocks on one of said die head parts and movable with the other and means for moving said die head parts to approach and recede from one another.

11. In a folding machine separate and relatively movable die head parts, guides carried by said die head parts, blocks slidable on said guides transversely to the relative movement of said die head parts, slotted bridging members engaging with the blocks on one of said die head parts and movable with the other, die plates carried by said die head parts and slidable blocks, side extension jaws on said die head parts and extending clear of said die plates and means interposed between and coöperating with said extension jaws to cause said die head parts to approach and recede from one another.

In testimony whereof I have signed my name to this specification in the presence of two subscribing witnesses.

EDGAR BEVERLEY FENBY.

Witnesses:
  JOHN STANIFORTH HILL,
  ROBERT HUGHES.

Copies of this patent may be obtained for five cents each, by addressing the "Commissioner of Patents, Washington, D. C."